US012619832B2

(12) United States Patent (10) Patent No.: US 12,619,832 B2
Mehrotra et al. (45) Date of Patent: May 5, 2026

(54) NATURAL LANGUAGE-BASED MANAGEMENT OF COMPUTING RESOURCES EXECUTING RADIO ACCESS NETWORK WORKLOADS

(71) Applicant: MICROSOFT TECHNOLOGY LICENSING, LLC, Redmond, WA (US)

(72) Inventors: Sanjeev Mehrotra, Redmond, WA (US); Anuj Kalia, San Francisco, CA (US); Manikanta Kotaru, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 302 days.

(21) Appl. No.: 18/335,745

(22) Filed: Jun. 15, 2023

(65) Prior Publication Data

US 2024/0419920 A1 Dec. 19, 2024

(51) Int. Cl.
 *G06F 40/40* (2020.01)
 *H04W 24/02* (2009.01)
(52) U.S. Cl.
 CPC ............ *G06F 40/40* (2020.01); *H04W 24/02* (2013.01)

(58) Field of Classification Search
 CPC ............................. G06F 40/40; H04W 24/02
 See application file for complete search history.

(56) References Cited

U.S. PATENT DOCUMENTS

| | | | |
|---|---|---|---|
| 2016/0070533 A1* | 3/2016 | Foster | G10L 15/22 |
| | | | 704/275 |
| 2019/0013018 A1* | 1/2019 | Rekstad | G06F 3/017 |
| 2019/0180739 A1* | 6/2019 | Raja | G06F 40/35 |

* cited by examiner

*Primary Examiner* — Richemond Dorvil
*Assistant Examiner* — Ethan Daniel Kim
(74) *Attorney, Agent, or Firm* — Newport IP, LLC; Jacob P. Rohwer

(57) ABSTRACT

The techniques disclosed herein manage computing environments associated with radio access networks using a natural language interface. This is achieved through utilizing natural language processing to analyze user generated inputs and generate robust large language model queries. In various examples, the queries can include radio access network documentation, diagnostic data, and past interactions to provide custom context to the large language model. Accordingly, the query can cause the large language model to generate an operation sequence comprising a plurality of commands to interface with a resource management tool and control computing resources and supporting components. In this way, the present techniques can alleviate the technical burden on end users and minimize the risk of errors.

20 Claims, 8 Drawing Sheets

FIG. 4B

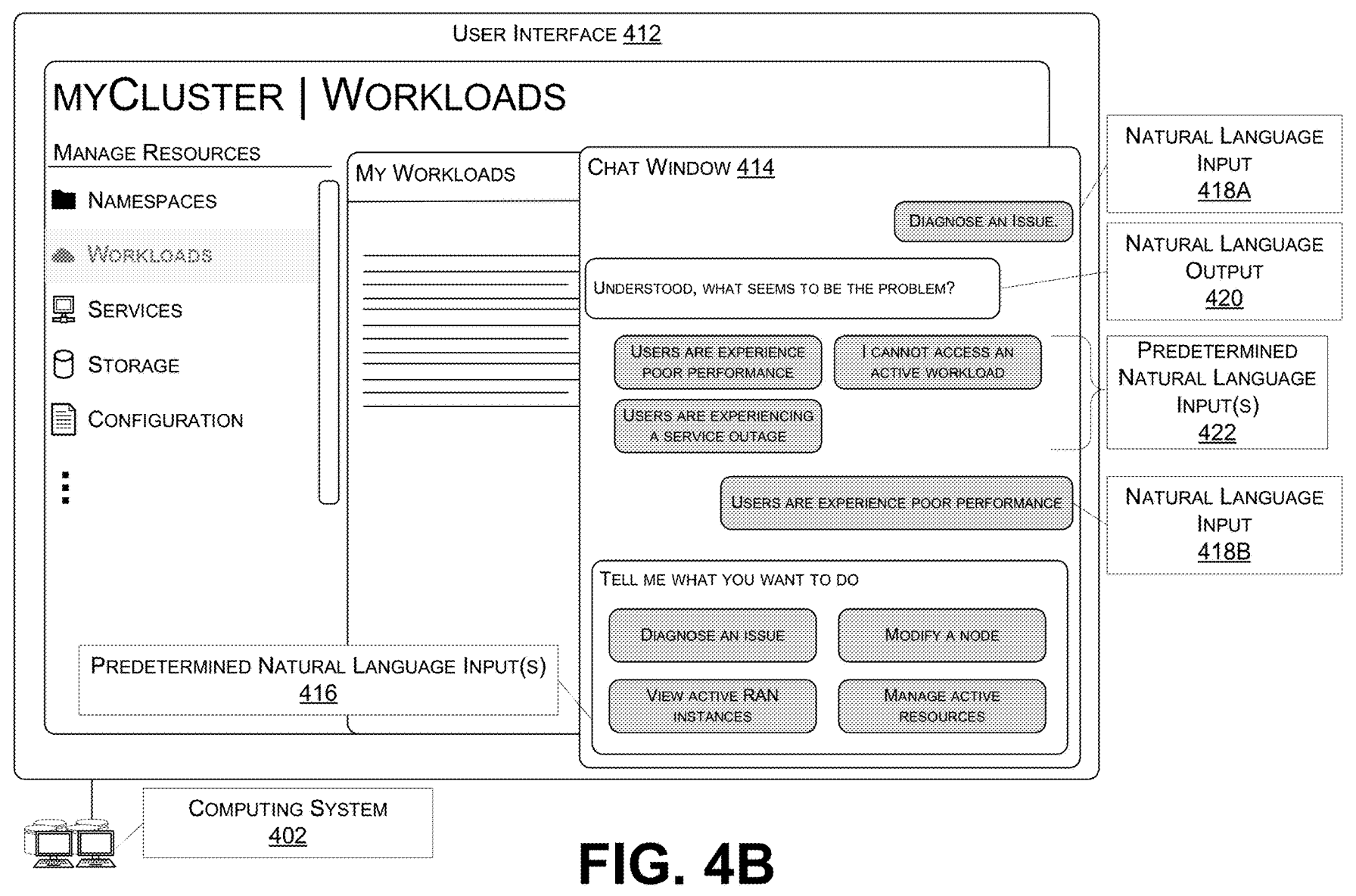

NATURAL LANGUAGE INPUT 418A

NATURAL LANGUAGE OUTPUT 420

PREDETERMINED NATURAL LANGUAGE INPUT(S) 422

NATURAL LANGUAGE INPUT 418B

USER INTERFACE 412

MYCLUSTER | WORKLOADS

MANAGE RESOURCES

NAMESPACES
WORKLOADS
SERVICES
STORAGE
CONFIGURATION
. . .

MY WORKLOADS

CHAT WINDOW 414

DIAGNOSE AN ISSUE.

UNDERSTOOD, WHAT SEEMS TO BE THE PROBLEM?

I CANNOT ACCESS AN ACTIVE WORKLOAD

USERS ARE EXPERIENCE POOR PERFORMANCE

USERS ARE EXPERIENCING A SERVICE OUTAGE

USERS ARE EXPERIENCE POOR PERFORMANCE

TELL ME WHAT YOU WANT TO DO

MODIFY A NODE

MANAGE ACTIVE RESOURCES

DIAGNOSE AN ISSUE

VIEW ACTIVE RAN INSTANCES

PREDETERMINED NATURAL LANGUAGE INPUT(S) 416

COMPUTING SYSTEM 402

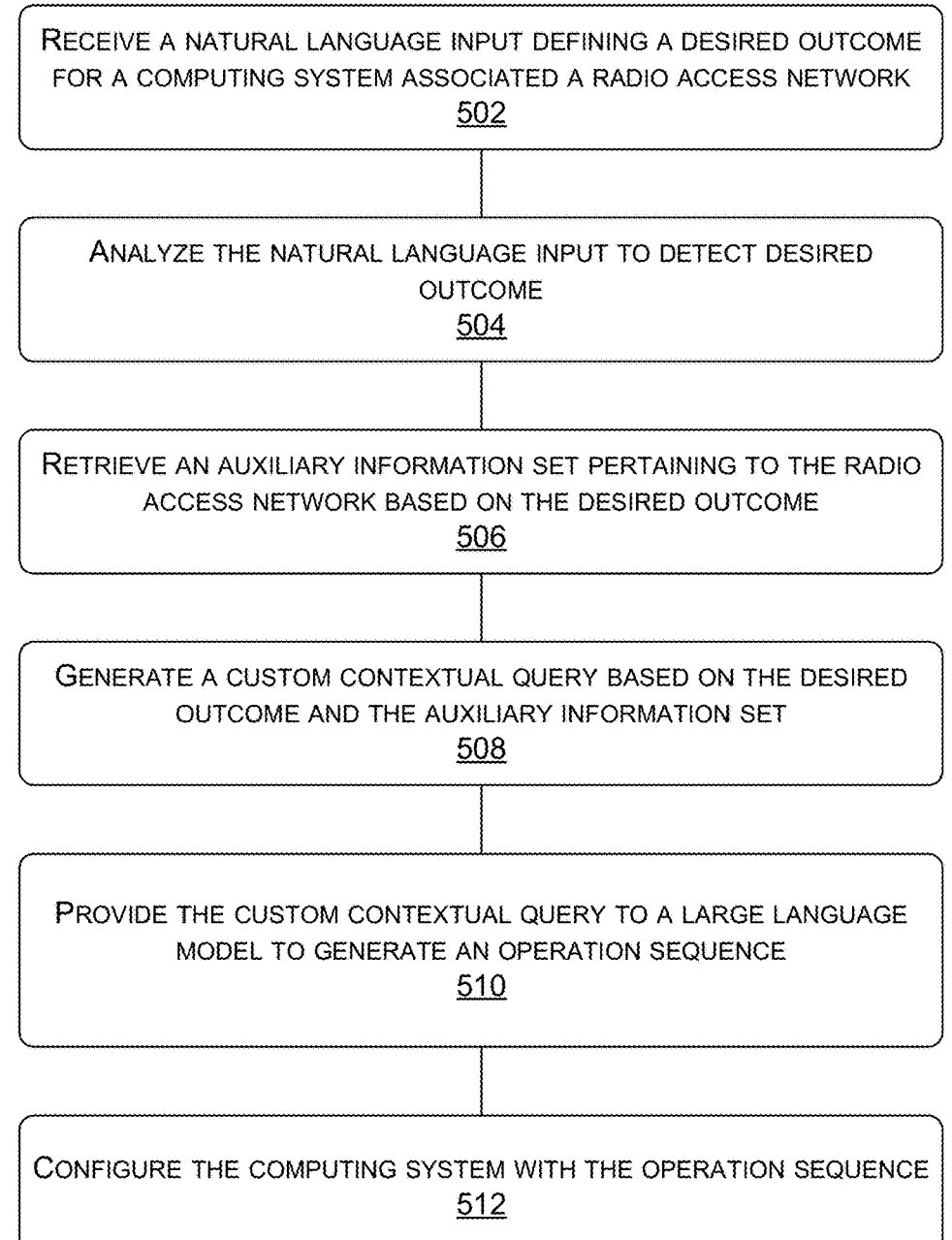

RECEIVE A NATURAL LANGUAGE INPUT DEFINING A DESIRED OUTCOME FOR A COMPUTING SYSTEM ASSOCIATED A RADIO ACCESS NETWORK
502

ANALYZE THE NATURAL LANGUAGE INPUT TO DETECT DESIRED OUTCOME
504

RETRIEVE AN AUXILIARY INFORMATION SET PERTAINING TO THE RADIO ACCESS NETWORK BASED ON THE DESIRED OUTCOME
506

GENERATE A CUSTOM CONTEXTUAL QUERY BASED ON THE DESIRED OUTCOME AND THE AUXILIARY INFORMATION SET
508

PROVIDE THE CUSTOM CONTEXTUAL QUERY TO A LARGE LANGUAGE MODEL TO GENERATE AN OPERATION SEQUENCE
510

CONFIGURE THE COMPUTING SYSTEM WITH THE OPERATION SEQUENCE
512

NATURAL LANGUAGE-BASED MANAGEMENT OF COMPUTING RESOURCES EXECUTING RADIO ACCESS NETWORK WORKLOADS

BACKGROUND

As cloud computing rapidly gains popularity, more and more data and/or services are stored and/or provided online via network connections. Providing an optimal and reliable user experience is an important aspect for cloud service providers that offer network services. In many scenarios, a cloud service provider may provide a service to thousands or millions of users (e.g., customers, clients, etc.) geographically dispersed around a country, or even the world. In order to provide this service, a cloud service provider often utilizes different resources, such as server farms, hosted in various datacenters. Access to these resources is typically provided by a cloud platform which operates the datacenters. In addition, the service can be constructed of various software components such as virtual machines, containers, and requisite management infrastructure. These software components may be collectively referred to as a cluster.

In recent years, a particular application space that has experienced the significant impact of cloud computing is radio access networks (RAN). Generally described, a radio access network is a component of a mobile telecommunication system that connects various devices (e.g., mobile phones, computers) to a core network (e.g., 5G, 4G LTE). Traditional radio access networks typically comprise many stand-alone base stations where each base station provides service to devices within a local geographical area. In addition, each base station possesses an individual set of resources (e.g., computing, cooling, power) to enable the base station to process and transmit its own signal to and from devices and forwards data payloads to the core network. Hence, the "cellular" nature of a cellular network.

There are many well-known limitations of these traditional network architectures. Most prominently, the isolated nature of the base stations can give rise to subsequent drawbacks. For instance, due to limited availability in the frequency spectrum, different base stations oftentimes utilize the same frequencies which can lead to interference between base stations. This issue can be exacerbated when a network operator adds additional base stations to the network to increase capacity. In another example, base stations can be highly resource inefficient. Due to the mobile nature of network users, traffic at a given base station can fluctuate dramatically. However, average utilization across all base stations of a network can often be very low, only intermittently experiencing spikes in traffic. In addition, traditional base stations often lack the ability to share computing resources with other base stations. As such, individual base stations may typically be designed for worst-case scenario processing loads thereby leading to poor resource efficiency and increased operating costs.

In contrast, cloud radio access networks (C-RANs), which can also be referred to as virtualized radio access networks (V-RAN) can leverage the computing power and flexibility of cloud platforms to virtualize radio access network functions. Consequently, cloud radio access networks can address many of the technical challenges facing traditional base station style radio access networks. For example, virtualizing functions that were previously performed by discrete computing devices enables the cloud radio access network to scale up and scale down available resources based on network conditions (e.g., traffic). In another example, centralizing network resources can streamline management and improve reliability. However, many existing tools for managing and orchestrating cloud computing resources such as Kubernetes may not have been designed with radio access network workloads in mind. As such, managing a cloud radio access network can be a highly complex task often requiring extensive manual customization. It is with respect to these and other considerations that the disclosure made herein is presented.

SUMMARY

The techniques disclosed herein enhance computing systems that execute radio access network (RAN) workloads through a natural language interface for managing computing resources. As mentioned above, radio access networks are components of a telecommunications system that connect devices such as mobile phones to the broader core network. While traditional systems utilized physical base stations to implement a radio access network, recent developments have seen rapid virtualization of radio access network functions using cloud computing infrastructure (e.g., a datacenter). However, managing computing resources for a cloud radio access network (C-RAN) can be a deeply complex task as many orchestration tools such as Kubernetes may not account for specific needs of radio access network workloads. For example, many default components can be ideal for standard web-based workloads in which computing resources can be freely enabled (e.g., scaled) and/or disabled (e.g., killed). In contrast, radio access network workloads must consider state when managing computing resources as freely enabling and/or disabling resources can degrade service quality (e.g., dropped calls).

To address the technical challenges of utilizing a computing system to implement specialized workloads such as a radio access networks, many operators develop custom components such as custom resource definitions, custom controllers, and custom workloads for configuring the radio access network. Developing such custom components can be a demanding technical challenge with a high risk of errors and complexity for end users (e.g., network technicians). Moreover, these custom components can require continuous work to ensure compatibility with standard protocol specifications. In still another technical challenge, many existing tools can lack support for important functionality such as migrating the radio access network without disruptions. As such, within the computing technical paradigm, operators must contend with highly complex processes for managing computing resources and/or workloads while maintaining consistent service quality.

To address these and other technical challenges, the system discussed herein provides a natural language interface to enable a user (e.g., a system engineer, a technician) to manage computing systems and radio access networks utilizing a natural language input (e.g., English). In various examples, the natural language input can define a desired outcome for the computing system. For instance, the natural language input can be "node A needs to be upgraded" in which the desired outcome is an upgrade to a particular computing resource.

A natural language processing module of the disclosed system can accordingly analyze the natural language input to generate a custom contextual query (e.g., a prompt). In some examples, the query can be the natural language input alone to instruct a large language model to execute the task defined by the natural language input. In other examples, the disclosed system can retrieve auxiliary information to supplement the natural language input. In this way, the natural language processing function can produce a more robust query to provide additional context to the large language model and improve performance of the large language model.

The custom contextual query can be subsequently provided to the large language model for execution. In various examples, the custom contextual query can cause the large language model to generate an operation sequence comprising a plurality of commands performing the necessary operations on the computing system and achieve the desired outcome defined by the natural language input. In a specific example, consider again the natural language input specifying that "node A needs to be upgraded." In response, to this natural language input, the large language model can generate an operation sequence that prevents new radio access network tasks from being scheduled to the relevant node, evict existing radio access network tasks from the node, and move those existing radio access network tasks to other nodes without causing disruptions to service.

Furthermore, the natural language processing module and the large language model can automatically coordinate with a resource management interface of the computing system to execute each of the commands in the operation sequence. As such, the disclosed system can perform the tasks defined by the natural language input with minimal manual intervention. In this way, the disclosed techniques can reduce the technical burden of operating a radio access network thereby streamlining day-to-day operations and improving overall efficiency.

In another technical benefit of the present disclosure, automating resource management tasks through a natural language interface and a large language model can improve service quality of the radio access network. As mentioned above, the complexity and custom development involved in operating a radio access network can result in errors and other technical difficulties. By automating resource management tasks through a natural language input, the disclosed system can minimize the risk of errors and potential service outages. For instance, a radio access network may require a custom endpoint for allocating computing resources, initializing workloads, and so forth. Such custom endpoints require compliance with specific protocols (e.g., E2/O1 protocols). Rather than place the technical burden of adhering to these protocols on the end user, the large language model can automatically generate the custom endpoint and translate the natural language input into the correct protocol specifications. In this way, the disclosed system can ensure custom configurations are consistently free from errors.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4B illustrates an alternative example user interface for providing natural language inputs to the system for managing a computing environment executing a radio access network via a large language model.

FIG. 5 is a flow diagram showing aspects of a routine for translating a natural language input into an automated computing resource management task for a radio access network providing a telecommunications service.

DETAILED DESCRIPTION

The techniques discussed herein enhance the functionality of computing systems that execute radio access networks providing a telecommunications service through a natural language interface and large language model to automate computing resource management tasks. As discussed above, managing a cloud radio access network can involve heavy manual customization of resource orchestration tools such as Kubernetes. Consequently, many traditional approaches can be error prone and unduly complex. In contrast, the features of the present disclosure enable computing systems to automate cloud radio access network management tasks to alleviate the technical complexity and reduce the risk of errors.

Various examples, scenarios, and aspects that enable natural language-based management of computing resources executing radio access network workloads are described below with respect to FIGS. 1-7.

Figure 1:
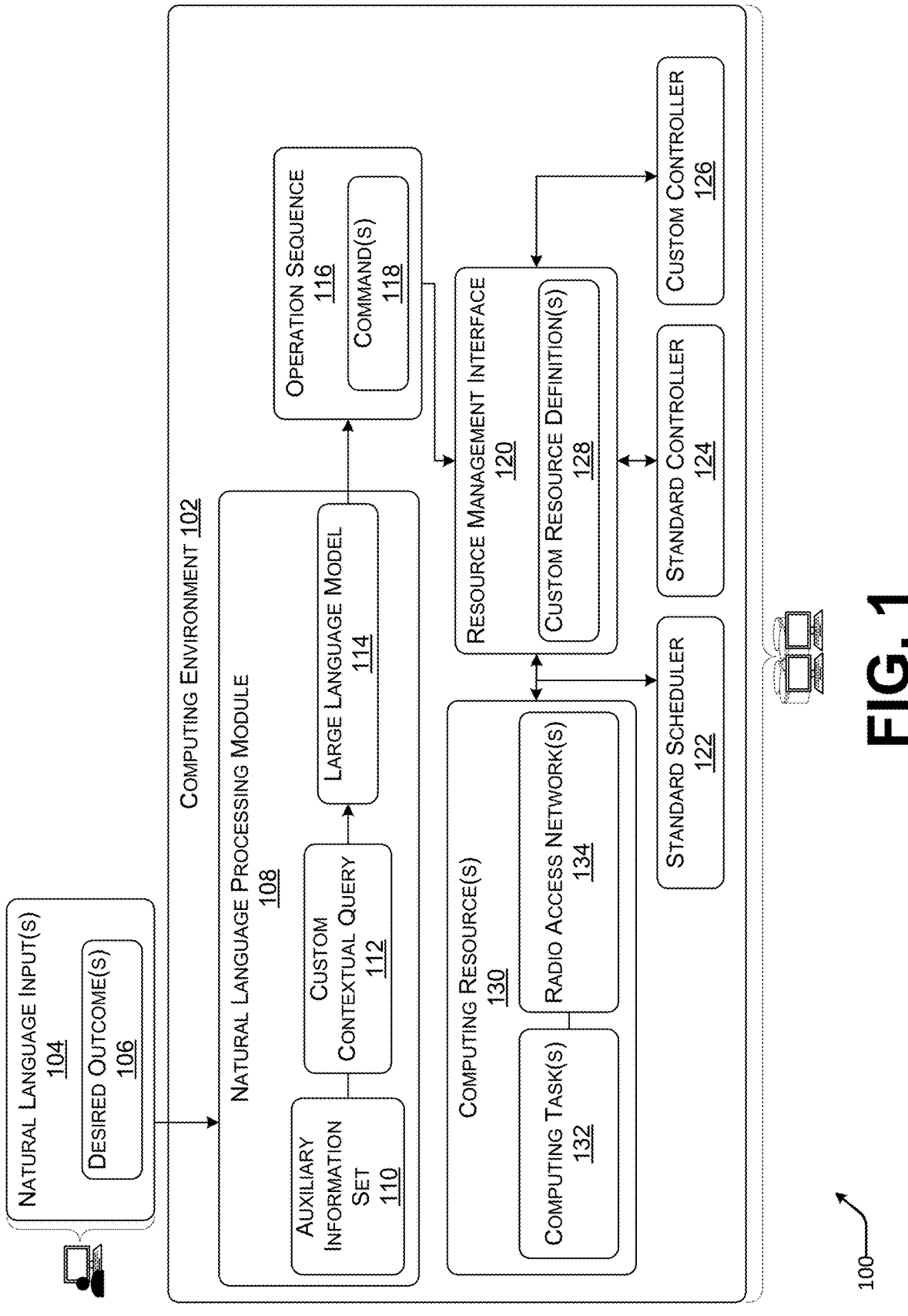
FIG. 1 is a block diagram of a system for utilizing a natural language interface to manage a computing environment executing a radio access network via a large language model.

FIG. 1 illustrates a system 100 in which a computing environment 102 is controlled via a natural language input 104. In various examples, the natural language input 104 can be provided by an end user (e.g., a technician, a system engineer) via a computing device that is connected to the computing environment 102. In various examples, the computing environment 102 can include any computing infrastructure that executes radio access network functionalities.

For instance, the computing environment 102 can include a virtualized centralized unit (vCU) and a mobile core executed by a central computing system (e.g., a cloud datacenter) and a virtualized distributed unit (vDU) executed by an edge computing system. That is, the computing environment 102 can comprise cloud computing devices, edge computing devices, and/or a combination of both cloud and edge computing devices. The natural language input 104 can accordingly define a desired outcome 106. That is, the desired outcome 106 can be understood as the stated goal of the natural language input 104. In a specific example, the natural language input 104 can be "scale out computing resources if CPU usage exceeds 95%". As such, the desired outcome of the natural language input 104 can be to firstly, monitor the computing resource usage of the computing environment 102 and secondly, allocate additional computing resources in the event the computing resource usage exceeds a predetermined threshold.

To process the natural language input 104, the computing environment 102 can utilize a natural language process module 108 to analyze the natural language input 104 and detect the desired outcome 106. The natural language processing module 108 can accordingly retrieve an auxiliary information set 110 based on the desired outcome 106 defined by the natural language input 104. For example, continuing with the natural language input 104 mentioned above ("scale out computing resources if CPU usage exceeds 95%"), the auxiliary information set 110 can include documentation pertaining to monitoring and allocating computing resources for radio access network workloads.

The natural language processing module 108 can subsequently generate a custom contextual query 112 based on the natural language input 104 and the auxiliary information set 110. In various examples, the custom contextual query 112 can also be referred to as a prompt. Generally described, a prompt commands a large language model to perform a certain task, typically in a natural language format (e.g., English). As advancements in large language models continue, prompt engineering has emerged as an important area of optimization to improve the performance of large language models. Depending on the format of the prompt, the large language model may produce vastly different outputs.

Consider one example, in which the natural language processing module 108 merely provides the natural language input 104 ("scale out computing resources if CPU usage exceeds 95%") as the custom contextual query 112 to a large language model 114. Without additional context, information, or constraints, the large language model 114 may fail to achieve the desired outcome 106. Now consider another example, in which the natural language input 104 is augmented by the auxiliary information set 110 to provide the large language model 114 with concrete examples and processes that are specific to the computing environment 102. In this way, the natural language processing module 108 can constrain the behavior of the large language model 114 and ensure consistent performance.

Subsequently, the natural language processing module 108 can provide the custom contextual query 112 to the large language model 114. In response, the large language model 114 can generate an operation sequence 116 comprising a plurality of commands 118 that perform one or more tasks to achieve the desired outcome 106 in accordance with processes, protocols, and other aspects of the auxiliary information set 110. In a specific example, the commands 118 can be Kubernetes commands such as GET, PUT, PATCH, POST, and DELETE. For instance, the auxiliary information set 110 can include documentation outlining a process and/or tutorial on allocating additional computing resources to a specific radio access network workload utilizing various commands 118. Accordingly, the large language model 114 can generate an operation sequence 116 that performs the process outlined by the documentation. In this way, the operation sequence 116 generated by the large language model 114 can streamline resource management operations. In various examples, the process defined by the documentation can be technically involved and thus time consuming if performed manually. In a specific example, migrating a radio access network workload to perform a software update without causing service disruptions can involve a complex series of commands that require significant technical expertise. As such, the large language model 114 can alleviate the technical burden of end users such as system engineers and technicians thereby improving system efficiency.

The operation sequence 116 can then be utilized to configure a resource management interface 120 for execution. Generally described, the resource management interface 120 can be a software component that exposes the functionality of a resource management and orchestration system such as Kubernetes. In Kubernetes, the resource management interface 120 can be analogous to an application programming interface (API) server that enables external components (e.g., the large language model 114) to communicate with the core components of a resource management and orchestration system such as a standard scheduler 122 and a standard controller 124, as well as custom components such as a custom controller 126 which can operate on custom resource definitions 128.

In various examples, a custom resource definition 128 can be a software component that is used to define a custom workload. For example, the computing environment 102 can comprise a set of computing resources 130 (e.g., CPUs, GPUs, virtual machines, containers) that execute various computing tasks 132. In a standard web application context, the resource management interface 120 can assign standard computing tasks 132 (i.e., workloads) to the computing resources 130 such as a Kubernetes deployment. However, for specialized workloads such as a radio access network 134, the resource management interface 120 may require custom resource definitions 128 to support the specific functionalities of the radio access network 134. For example, the resource management interface 120 can be configured with a "RAN" custom resource definition 128. Likewise, the custom controller 126 can be a specialized form of the standard controller 124 that can communicate with the resource management interface 120 and operate on custom resource definitions 128 such as the radio access network 134.

In various examples, the custom controller 124 can monitor a state of the computing environment 102 (e.g., compute and networking), some subset of a standard resource definition and/or the custom resource definitions 128 in the resource management interface 120, and the actual state of the computing resources 130 on the cluster. For example, the actual state of a standard computing resource can specify whether a computing task 132 (e.g., a Kubernetes pod) has terminated. In another example, the state of the cluster can specify that a node needs to be upgraded. In still another example, the specification of the custom resource definition can specify a configuration for the radio access network 134. In response to changes to the state of the items being monitored, the custom controller 126 can in turn create, manage, and delete instances of the computing resources 130 (e.g., Kubernetes pods, virtual machines) by communicating with the resource management interface 120. Due to the uniquely technical challenge of managing a radio access network 134, the actions performed by the custom controller 126 can be much more complex than simply creating a new Kubernetes pod on a cluster. In a specific example, moving a pod executing a virtualized distributed unit (vDU) in response to node migration can involve a complex series of timed tasks that require precise timing. In order to migrate a node, a new vDU pod is created, followed by insertion of a software switch container to replicate networking traffic, followed by communication with a pod executing a virtualized centralized unit (vCU) to migrate each piece of user equipment. After all the migrations are complete, the software switch and the old vDU pod can be removed.

Accordingly, the commands 118 of the operation sequence 116 can utilize the resource management interface 120 and any of the standard scheduler 122, standard controller 124, custom controller 126, and custom resource definitions 128 to cause the computing resources 130 to execute an automated computing task 132 to achieve the desired outcome 106 defined by the natural language input 104. In a specific example, the natural language input 104 can state that "node A needs to be upgraded" in which the desired outcome 106 is applying an upgrade to "node A" of the computing resources 130. As such, the natural language processing module 108 can analyze the natural language input 104 and retrieve an auxiliary information set 110 that pertains to upgrading nodes in a cloud radio access network context. For instance, the natural language processing module 108 can have access to an internal database storing documentation defining various processes and best practices which can serve as the auxiliary information set 110.

Utilizing the natural language input 104 and the auxiliary information set 110, the natural language processing module 108 can generate a custom contextual query 112 that incorporates the natural language input 104 and the auxiliary information set 110. In this way, the behavior of the large language model 114 can be constrained within the specific context of the computing environment 102 executing the radio access network 134. Accordingly, the custom contextual query 112 can be provided to the large language model 114 which can generate an operation sequence 116 comprising a series of commands 118 that cause the resource management interface 120 to prevent computing tasks 132 from being scheduled to the node (e.g., node A), evict existing computing tasks 132 from the node, and move the existing computing tasks 132 to another node utilizing various techniques to migrate the radio access network 134 without disruptions to service. As mentioned above, cloud radio access networks can be particularly sensitive to changes in state such as service outages and thus require specialized techniques for resource management and live migration. In this way, the disclosed techniques can maintain a consistent state of service and thus ensure service quality.

In another example, the natural language input 104 can instruct the system 100 to "deploy a new radio access network". Accordingly, the natural language processing module 108 can retrieve an auxiliary information set 110 pertaining to configuring and deploying a new radio access network 134. For instance, the auxiliary information set 110 can include documentation on generating the custom controller 126 and the custom resource definition 128, allocating computing resources 130, and proper configuration procedures. The natural language processing module 108 can thusly generate a custom contextual query 112 to configure the large language model 114. In turn the large language model 114 can generate an operation sequence 116 to carry out the desired outcome 106 defined by the natural language input 104 in accordance with the procedures defined in the auxiliary information set 110. For instance, the operation sequence 116 can, via the resource management interface 120, automatically generate requisite custom components such as the custom controller 126 and the custom resource definitions 128 for a new radio access network 134 as well as components for configurating the new radio access network 134 such as a YAML manifest which can be submitted to the computing resources 130. Moreover, the operation sequence 116 can configure a computing task 132 (e.g., a custom workload) to serve as a custom endpoint for configuring the radio access network 134. By utilizing the large language model 114 and a well-defined knowledge set such the auxiliary information set 110, the system 100 can ensure consistent service through automated resource management operations and reduce the risk of errors thereby improving overall efficiency.

Figure 2:
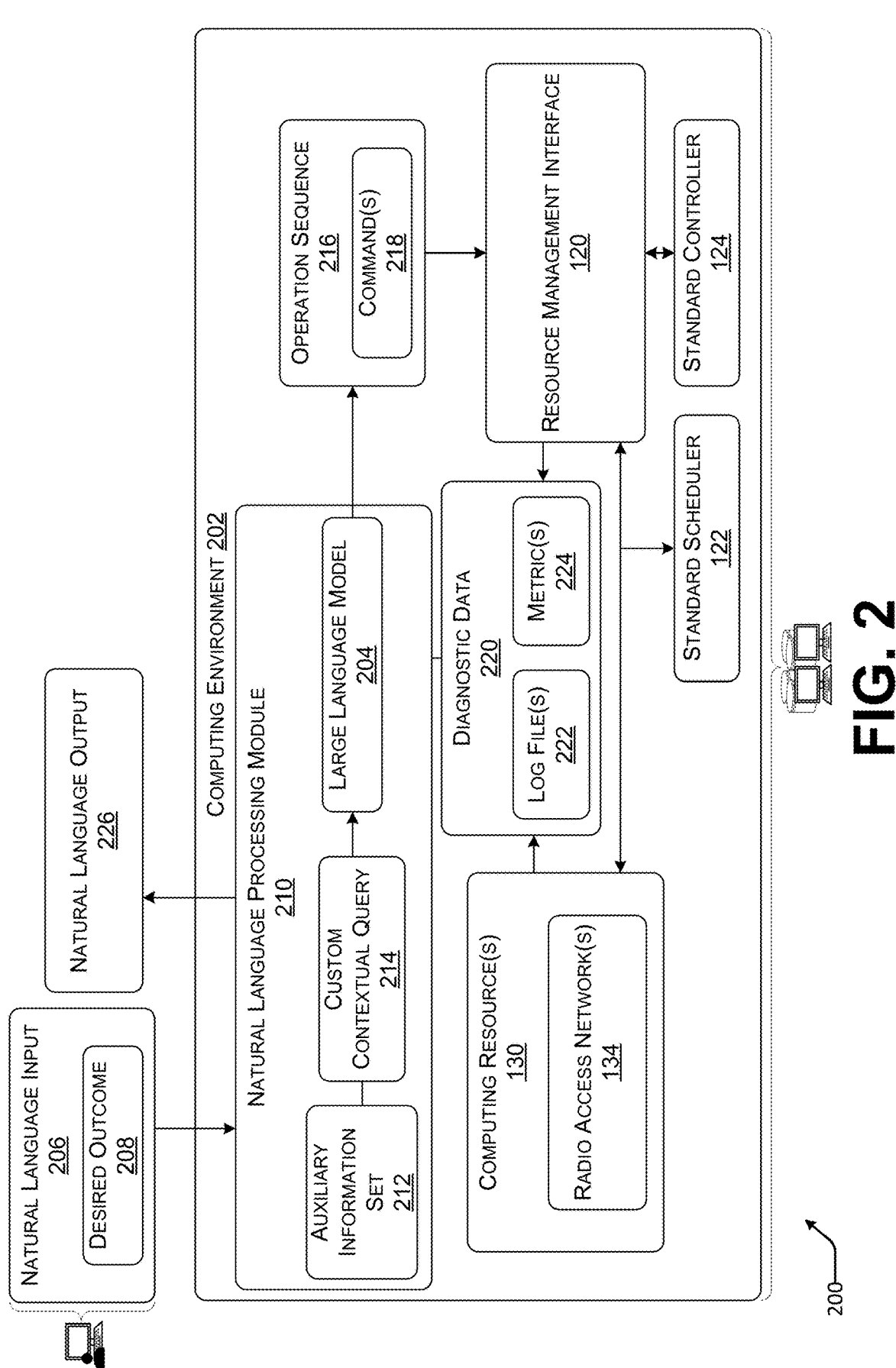
FIG. 2 is a block diagram of an alternative system for utilizing a natural language interface to manage a computing environment executing a radio access network via a large language model utilizing deeper integration with the large language model to simplify the system architecture.

Turning now to FIG. 2, aspects of a system 200 in which a computing environment 202 utilizes deeper integration with a large language model 204 to simplify system architecture are shown and described. As with the computing environment 102 discussed with respect to FIG. 1, the computing environment 202 can include any computing infrastructure that executes radio access network functionalities. For instance, the computing environment 102 can include a virtualized centralized component (vCU) and a mobile core executed by a central computing system (e.g., a cloud datacenter) and a virtualized distributed unit (vDU) executed by an edge computing system. That is, the computing environment 102 can comprise cloud computing devices, edge computing devices, and/or a combination of both cloud and edge computing devices.

As discussed above with respect to FIG. 1, a computing environment 102 can integrate a large language model 114 to translate natural language inputs 104 into an operation sequence 116 to perform automated computing resource management tasks including specialized workloads such as the radio access network 134. Accordingly, the large language model 114 can, via the operation sequence 116, automatically generate custom components such as the custom controller 126 and custom resource definitions 128 to support various functionalities of the radio access network 134. In this way, the large language model 114 can alleviate the technical burden faced by end users (e.g., technicians, system engineers).

However, in some examples, through deeper integration of large language model functionality, the disclosed techniques can simplify system architectures by obviating custom components such as those illustrated in the system 200 shown in FIG. 2. As discussed above, manually managing custom workloads for a cloud radio access network can be a deep technical challenge often necessitating heavy customization of existing orchestration tools such as Kubernetes. In contrast, the system 200 can utilize a large language model 204 to directly fulfill the functions of custom components. In this way, the large language model 204 can enable efficient execution of complex tasks such as diagnosing performance issues and debugging. For instance, like the examples discussed above, the system 200 can receive a natural language input 206 from an end user defining a desired outcome 208. The natural language input 206 can be subsequently analyzed by a natural language processing module 210 to retrieve a relevant auxiliary information set 212 and generate a custom contextual query 214 (e.g., a prompt).

Accordingly, the custom contextual query 214 can cause the large language model 204 to generate an operation sequence 216 comprising a plurality of commands 218 that operate on the computing environment 202 to achieve the desired outcome 208 defined by the natural language input 206. However, unlike the examples discussed above with respect to FIG. 1, rather than utilize custom components, the large language model 204 can generate commands 218 that can directly communicate, via the resource management interface 120, to the computing resources 130 executing a radio access network 134. In a specific example, consider a situation in the context of Kubernetes where the resource management interface 120 can be the Kubernetes API server. Where some systems may require custom components (e.g., a custom controller 126) to act as intermediaries between the resource management interface 120 and specialized workloads such as the radio access network 134, the large language model 204 can obviate the custom components by instead utilizing standard Kubernetes commands to fulfill the functions of the custom components.

In a specific example, a simplified system architecture enabled by the large language model 204 can streamline additional specialized workloads such as radio access network debugging. In this example, the natural language input 206 can instruct the system 200 to "find the issue causing users to experience poor performance" where the desired outcome to diagnose an "issue causing users to experience poor performance". In response, the natural language processing module 210 can retrieve an auxiliary information set 212 that pertains to diagnosing performance issues such as documentation identifying troubleshooting processes. The resultant custom contextual query 214 can accordingly incorporate the auxiliary information set 212 and the natural language input 206.

In turn, the large language model 204 can generate an operation sequence 216 in accordance with the custom contextual query 214 comprising a plurality of commands 218 to extract diagnostic data 220 from the computing resources 130 and/or the resource management interface. In various examples, the diagnostic data 220 can include log files 222 defining events that took place at a certain time within the system 200 such as changed configurations, changed workloads, and so forth. In addition, the diagnostic data 220 can include metrics 224 defining various measures of performance of the system 200 such as resource utilization, latency, temperature, and the like. Leveraging the strong natural language processing capabilities of the large language model 204, the system 200 can automatically analyze the diagnostic data 220 in light of the desired outcome 208 and the auxiliary information set 212 to detect specific issues. Accordingly, the analysis of the large language model 204 can be provided to the user as a natural language output 226. In this way, the large language model 204 can eliminate the need for a user to produce customized automation tools for diagnosing and debugging issues.

Furthermore, the large language model 204 can suggest solutions to issues detected from analysis of the diagnostic data 220. For example, the large language model 204 can determine that "the issue causing users to experience poor performance" is overloading of the computing resources 130 executing the radio access network 134 (e.g., heavy demand). In response, the large language model 204 can generate an operation sequence 216 to allocate additional resources to the radio access network 134 to alleviate the performance issues. Alternatively, the natural language output 226 can request user confirmation to allocate additional resources via the natural language output 226. In response to a user confirmation, the large language model 204 can accordingly generate the operation sequence 216.

Figure 3:
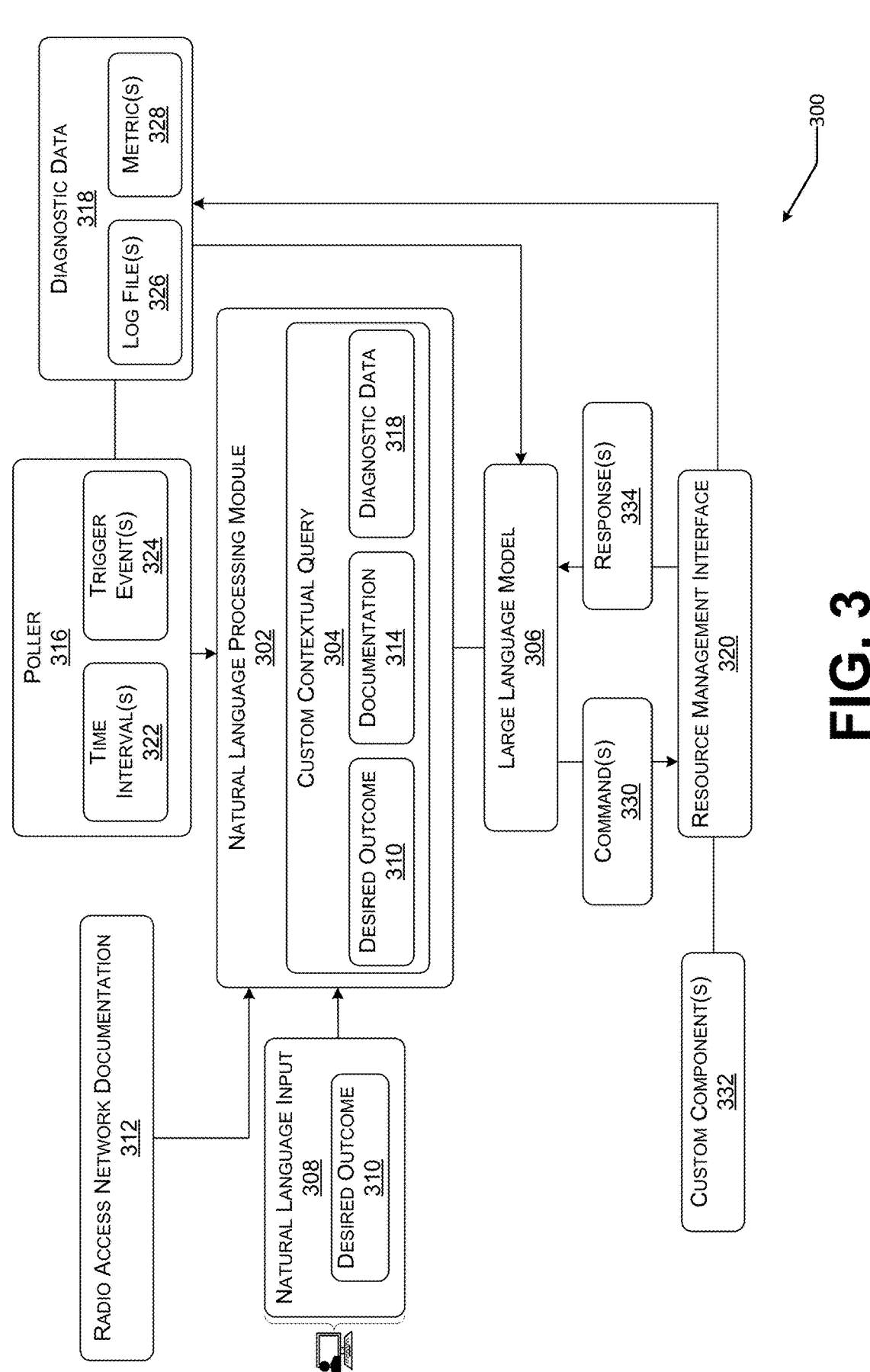
FIG. 3 is a block diagram illustrating additional technical aspects of the natural language processing module for generating the custom contextual queries.

Proceeding to FIG. 3, aspects of a system 300 for enhancing a natural language processing module 302 for generating a custom contextual query 304 (e.g., a prompt) are shown and described. As mentioned above, prompt engineering has emerged as an important area of optimization in large language model performance. In various examples, the content of a custom contextual query 304 can dramatically affect the behavior and ultimately performance of a large language model 306. For example, a vague prompt that lacks context can cause the large language model 306 to behave erratically thereby leading to poor performance. In contrast, a custom contextual query 304 that includes detailed instructions as well as supplementary material to provide context can ensure consistent behavior and thus high performance from the large language model 306.

To generate a custom contextual query 304, the natural language processing module 302 can primarily consider a user generated natural language input 308 that defines a desired outcome 310 with respect to a radio access network. In a specific example, the natural language input 308 can request the system 300 to "list the RAN instances on the cluster". Subsequently, the natural language processing module 302 can analyze the natural language input 308 to determine the desired outcome 310. In some examples, the natural language processing module 302 can include an intrinsic instruction within the desired outcome 310 to constrain the behavior of the large language model 306. For instance, the intrinsic instruction can constrain the large language model 306 within the context of a specific radio access network.

Likewise, to enhance the custom contextual query 304, the natural language processing module 302 can be granted access to supplementary material such as a set of radio access network documentation 312. The natural language processing module 302 can accordingly extract a specific subset of documentation 314 from the radio access network documentation 312 that is most relevant to the desired outcome 310. In the present example, the documentation 314 can define what constitutes a "RAN instance" to provide context to the large language model 306. In this way, the system 300 can limit the documentation 314 to the most salient portions of the radio access network documentation 312 thereby reducing processing times.

Furthermore, the natural language processing module 302 can receive input from a poller 316 to further enhance the custom contextual query 304. In various examples, a poller 316 can be a software component that can automatically retrieve diagnostic data 318 from a resource management interface 320. The poller 316 can be configured to retrieve the diagnostic data 318 at regular time interval 322 (e.g., once per hour). In addition, the poller 316 can retrieve the diagnostic data 318 in response to a trigger event 324 such as a resource failure. Moreover, the poller 316 can retrieve the diagnostic data 318 in response to a user trigger. As discussed above, the diagnostic data 318 can include log files 326 and/or metrics 328 to enable monitoring of a computing environment. In this way, the system 300 can generate robust custom contextual queries 304 to ensure consistent performance from the large language model 306.

In accordance with the custom contextual query 304, the large language model 306 can generate a series of commands 330 (e.g., an API request) such as the operation sequences discussed above. The commands 330 can operate on computing resources executing a radio access network via the resource management interface 320. In addition, the commands can control various custom components 332 such as a custom controller and/or a custom resource definition as described in the examples above. Furthermore, the large language model 306 can receive responses 334 from the resource management interface 320 in response to the individual commands 330. In a specific example, the large language model 306 can generate a series of commands 330 to install a horizontal autoscaler custom component 332 to dynamically allocate additional resources to a radio access network. Accordingly, the resource management interface 320 can generate a response 334 confirming a successful installation of the custom component 332.

In various examples, the large language model 306 can store a history of the responses 334 as well as diagnostic data 318 to inform future behaviors and further adapt to the context of a cloud radio access network. Stated another way, the system 300 can continue to train the large language model 306 in a live deployment context to improve performance over time. In this way, the system 300 can ensure consistent behavior and high performance from the large language model 306 through robust custom contextual queries 304 that are enhanced through domain specific radio access network documentation 312 and diagnostic data 318.

Figure 4A:
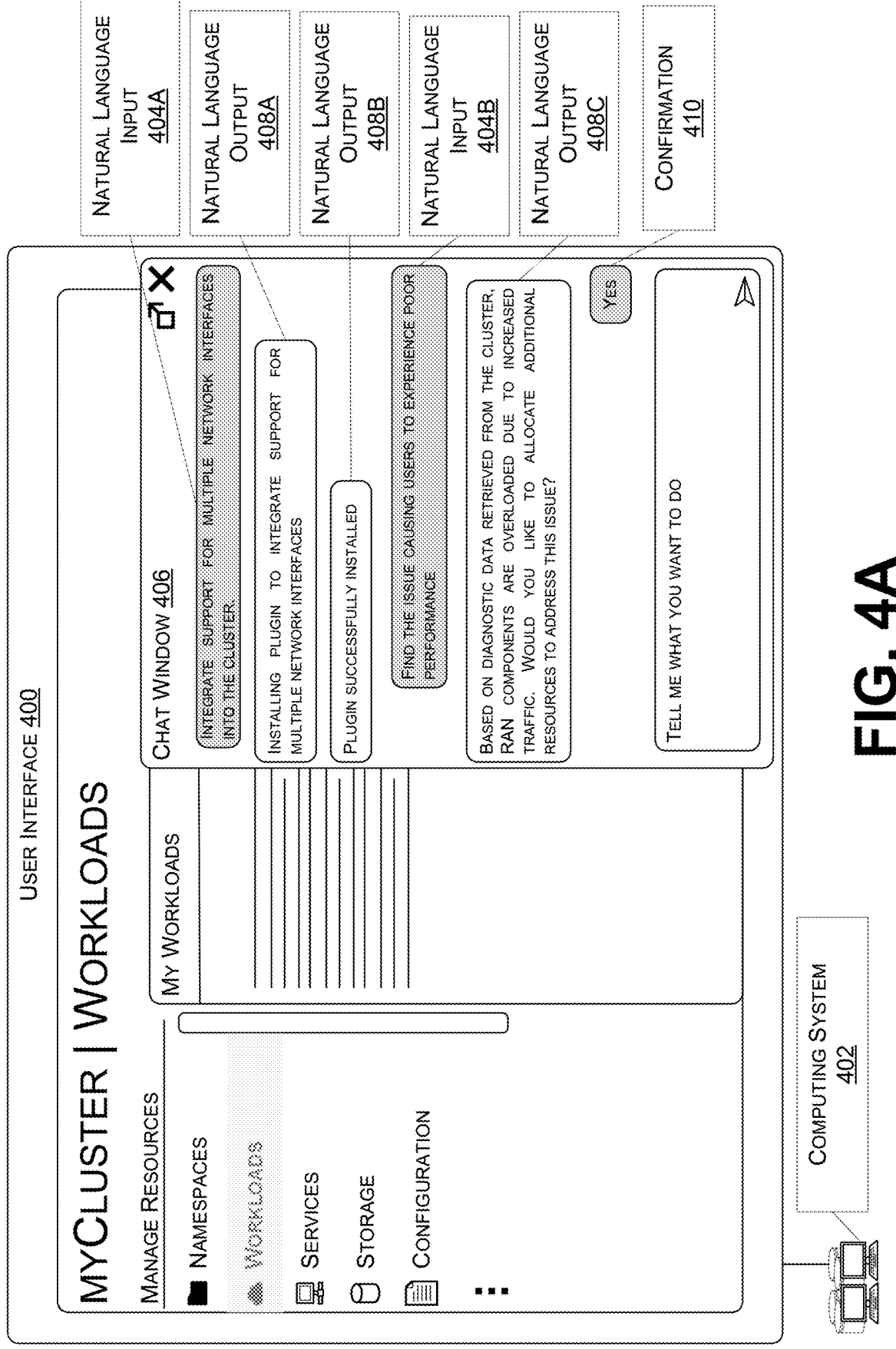
FIG. 4A illustrates an example user interface for providing natural language inputs to the system for managing a computing environment executing a radio access network via a large language model.

Turning now to FIG. 4A, aspects of a natural language user interface 400 for interacting with a computing system 402 executing a radio access network are shown and described. As discussed above, an end user (e.g., a technician, a system engineer) can generate a natural language input 404 expressing a desired outcome with respect to the computing system 402 and/or the radio access network therein. For example, the natural language input 404A can request that the computing system 402 "integrate support for multiple network interfaces in the cluster" to implement various network functionalities and be provided in a chat window 406 in which the user can freely generate natural language inputs 404. In response, as in the examples discussed above, the computing system 402 can process the natural language input 404A using a natural language processing module to generate a custom contextual query (e.g., a prompt) for a large language model. Subsequently, the large language model can generate an operation sequence to achieve the desired outcome defined by the natural language input 404A.

Accordingly, the computing system 402 can generate a first natural language output 408A to acknowledge receipt of the natural language input 404A. A second natural language output 408B can confirm that the operation sequence fulfilling the request of the natural language output 404A was successfully completed. In various examples, the first natural language output 408A can be generated and displayed at a first time in response to receiving the natural language input 404A. The second natural language output 408B can be generated and displayed at a second time upon completion of the task initiated in response to the natural language input 404A.

In another example, the user can provide a second natural language input 404B requesting that the computing system 402 "find the issue causing users to experience poor performance". As discussed above, the large language model can generate an operation sequence to collect diagnostic data from the computing resources and/or the resource management interface. Moreover, the large language model can analyze the diagnostic data to determine the root cause of various issues such as resource utilization and resultant increases in latency.

Accordingly, the computing system 402 can generate a third natural language output 408C informing the user of the issue causing poor performance. As shown, the large language model of the computing system 402 can determine that "RAN components are overloaded". In addition, the third natural language output 408C can suggest a solution to the problem identified by the large language mode from the diagnostic data. Namely, that the computing system can "allocate additional resources to address this issue". In response to a confirmation 410 from the user, the large language model of the computing system 402 can proceed to allocate additional computing resources to resolve the issue. In this way, the natural language user interface 400 can enable a user to implement new networking functionality within the radio access network with little technical burden. Moreover, the natural language user interface 400 can enable the user to quickly identify and address issues in the radio access network with a likewise low technical burden.

Turning now to FIG. 4B, an alternative natural language user interface 412 is shown and described. While the chat window 406 discussed above with respect to FIG. 4A enabled a user to freely produce natural language inputs (e.g., text, voice), the chat window 414 may instead utilize a set of predetermined natural language inputs 416. In various examples, each of the predetermined natural language inputs 416 can correspond to a respective predetermined query (e.g., a prompt). That is, selecting a predetermined natural language input 416 can cause the computing system 402 to configure a large language model with the predetermined query.

Accordingly, the user can select from the set of predetermined natural language inputs 416 to generate a first natural language input 418A requesting that the computing system 402 "diagnose an issue". In response, the computing system 402 can generate a natural language output 420 acknowledging the natural language input 418A. In addition, the computing system 402 can generate a second set of predetermined natural language inputs 422 via a large language model based on the context of the first natural language input 418A. For instance, the first natural language input 418A may indicate that an issue has occurred. As such, the second set of predetermined natural language inputs 422 can relate to various potential issues within a radio access network. The user can subsequently select from the second set of predetermined natural language inputs 422 to produce a second natural language input 418B specifying the issue to be diagnosed. In this way, an operator can reduce the processing load on the computing system 402 through predetermined prompts and branching conversational dialogue. Consequently, an operator can elect to implement a free form chat window 406 as shown above and/or a branching chat window 414 based on performance considerations, resource availability, and other factors.

Proceeding to FIG. 5, aspects of a routine 500 for translating a natural language input into an automated computing resource management task for a radio access network providing a telecommunications service are shown and described. With reference to FIG. 5, the routine 500 begins at operation 502 where a natural language input defining a desired outcome for a computing system associated with the radio access network is received.

Next, at operation 504, the natural language input is analyzed utilizing the natural language processing function to detect the desired outcome for the computing system associated with the radio access network.

Then, at operation 506, an auxiliary information set pertaining to the radio access network is retrieved based on the desired outcome.

Subsequently, at operation 508, a custom contextual query is generated based on the desired outcome defined by the natural language input and the auxiliary information set.

Then, at operation 510, the custom contextual query is provided to a large language model. The custom contextual query causes the large language model to generate an operation sequence containing a plurality of commands defining the automated computing resource management task.

Finally, at operation 512, the computing system associated with the radio access network is configured with the operation sequence generated by the large language model based on the desired outcome defined by the natural language input and the auxiliary information set. When executed, the operation sequence causes the radio access network to perform the automated computing resource management task.

For ease of understanding, the process discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
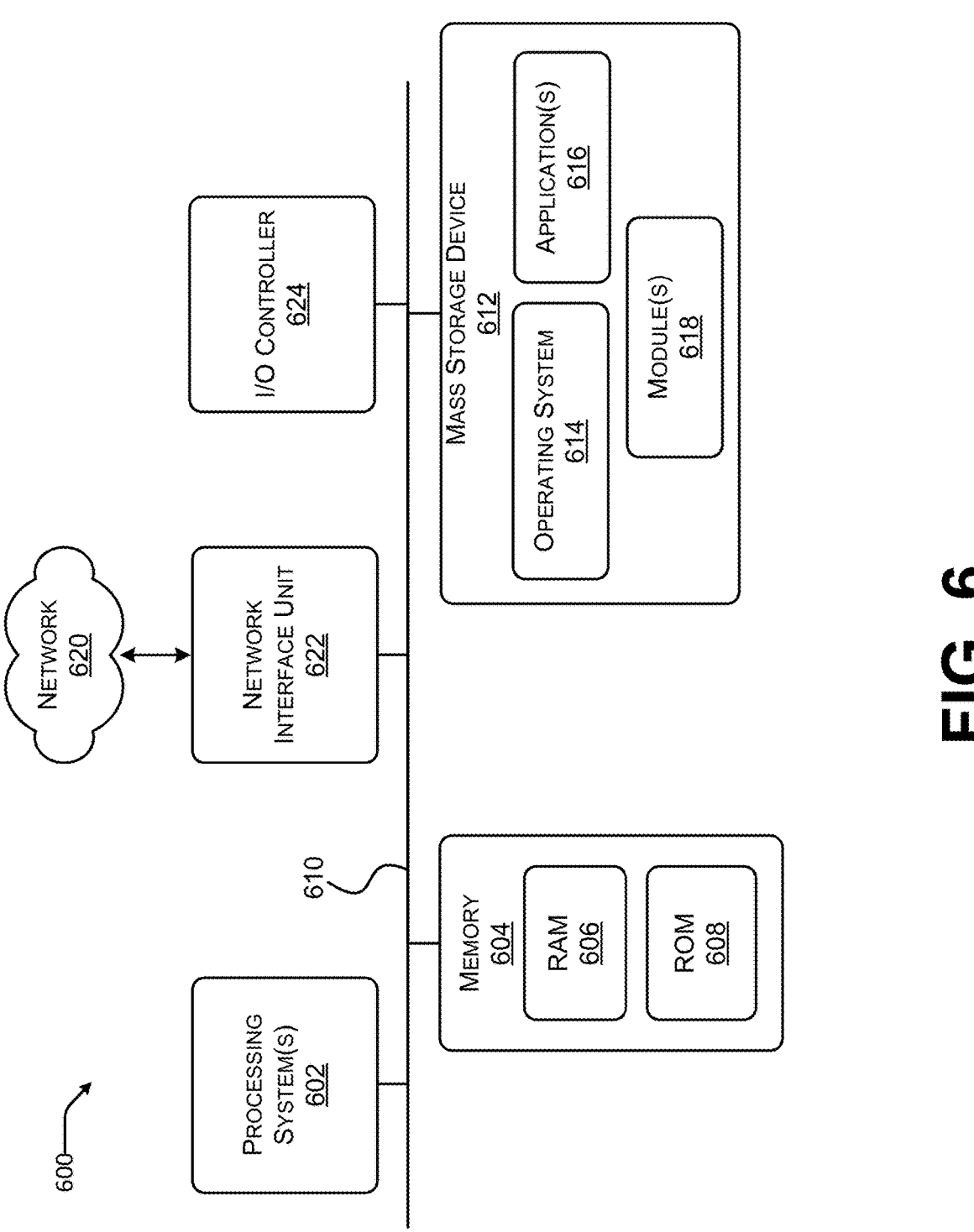
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud or edge platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. For example, the processing system 602 can include graphical processing units (GPUs) for executing complex artificial intelligence applications such as large language models. Moreover, the systems discussed herein can be provided as a distributed computing system such as a cloud/edge service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
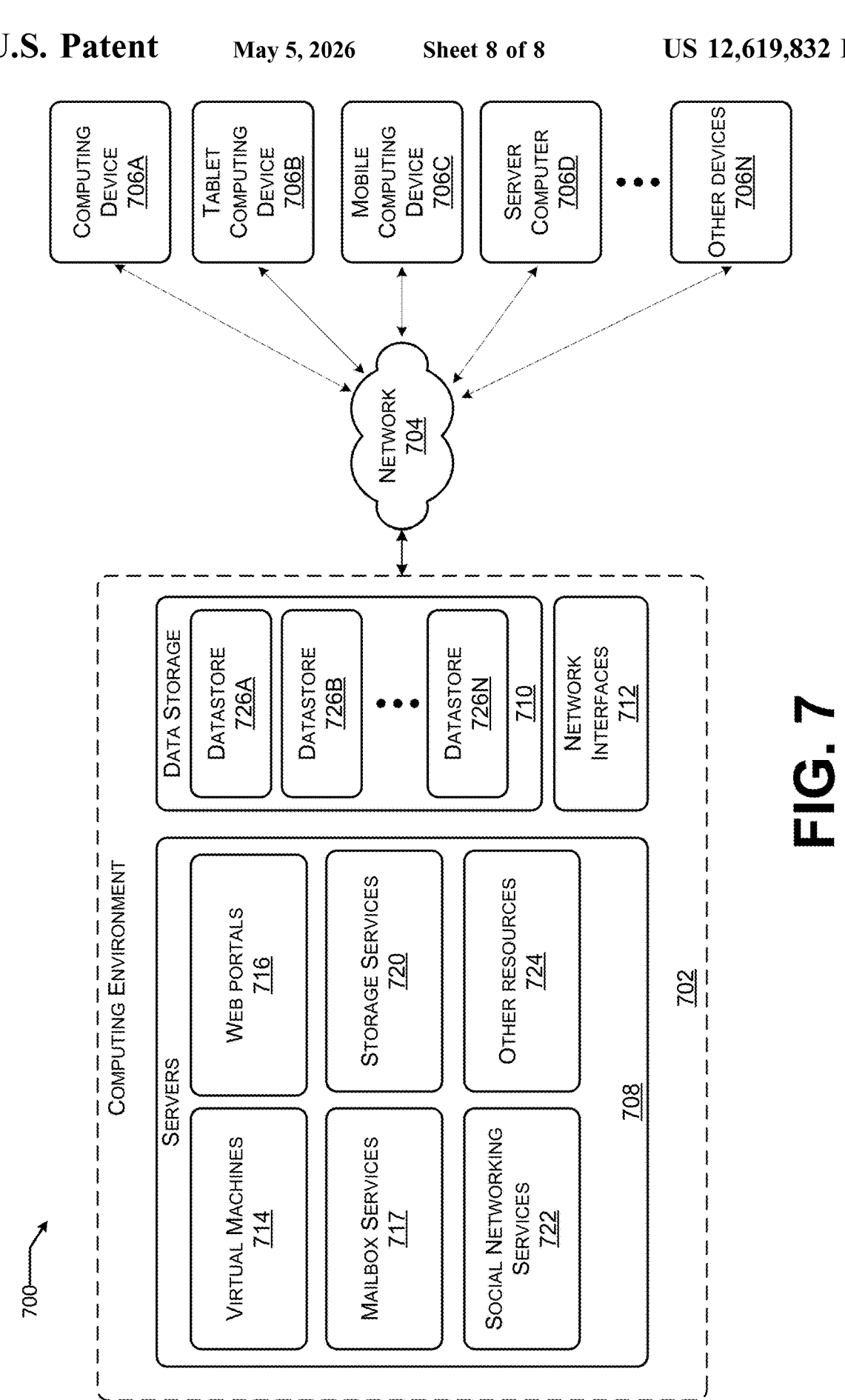
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for translating a natural language input into an automated computing resource management task for a radio access network providing a telecommunications service, the method performed by a computing environment associated with the radio access network, the method comprising: receiving the natural language input defining a desired outcome for the computing environment associated with the radio access network; analyzing the natural language input utilizing a natural language processing function to detect the desired outcome for the computing environment associated with the radio access network; retrieving, based on the desired outcome, an auxiliary information set pertaining to the radio access network; generating, by the natural language processing function, a custom contextual query based on the desired outcome defined by the natural language input and the auxiliary information set; providing the custom contextual query to a large language model of the natural language processing function, wherein the custom contextual query causes the large language model to generate an operation sequence containing a plurality of commands defining the automated computing resource management task; and configuring the computing environment associated with the radio access network with the operation sequence generated by the large language model based on the desired outcome defined by the natural language input and the auxiliary information set, wherein the operation sequence causes the computing environment associated with the radio access network to perform the automated computing resource management task.

Example Clause B, the method of Example Clause A, wherein the desired outcome defined by the natural language input comprises an implementation of networking functionality within the radio access network.

Example Clause C, the method of Example Clause B, wherein the operation sequence causes the computing system associated with the radio access network to retrieve and install a component facilitating the network functionality.

Example Clause D, the method of any one of Example Clause A through C, wherein the auxiliary information set comprises documentation that is specific to the computing system associated with the radio access network.

Example Clause E, the method of any one of Example Clause A through C, wherein the auxiliary information set comprises diagnostic information that is retrieved in response to an event within the radio access network.

Example Clause F, the method of any one of Example Clause A through E, wherein the custom contextual query includes an intrinsic instruction for constraining a behavior of the large language model.

Example Clause G, the method of any one of Example Clause A through F, wherein the natural language input is a predetermined natural language input that is selected from a set of predetermined natural language inputs.

Example Clause H, a system for translating a natural language input into an automated computing resource management task for a radio access network providing a telecommunications service, the system comprising: a processing system; and a computer readable medium having encoded thereon computer readable instructions that when executed by the processing system cause the system to perform operations comprising: receiving the natural language input defining a desired outcome for the radio access network; analyzing the natural language input utilizing a natural language processing function to detect the desired outcome for the radio access network; retrieving, based on the desired outcome, an auxiliary information set pertaining to the radio access network; generating, by the natural language processing function, a custom contextual query based on the desired outcome defined by the natural language input and the auxiliary information set; providing the custom contextual query to a large language model of the natural language processing function, wherein the custom contextual query causes the large language model to generate an operation sequence containing a plurality of commands defining the automated computing resource management task; and executing the operation sequence generated by the large language model based on the desired outcome defined by the natural language input and the auxiliary information set, wherein execution of the operation sequence causes the radio access network to perform the automated computing resource management task.

Example Clause I, the system of Example Clause H, wherein the desired outcome defined by the natural language input comprises an implementation of networking functionality within the radio access network.

Example Clause J, the system of Example Clause I, wherein the operation sequence causes the system to retrieve and install a component facilitating the network functionality.

Example Clause K, the system of any one of Example Clause H through J, wherein the auxiliary information set comprises documentation that is specific to the radio access network.

Example Clause L, the system of any one of Example Clause H through J, wherein the auxiliary information set comprises diagnostic information that is retrieved in response to an event within the radio access network.

Example Clause M, the system of any one of Example Clause H through J, wherein the custom contextual query includes an intrinsic instruction for constraining a behavior of the large language model.

Example Clause N, the system of any one of Example Clause H through M, wherein the natural language input is a predetermined natural language input that is selected from a set of predetermined natural language inputs.

Example Clause O, a computer readable storage medium having encoded thereon computer readable instructions that, when executed by a system, cause the system to perform operations comprising: receiving a natural language input defining a desired outcome for a radio access network; analyzing the natural language input utilizing a natural language processing function to detect the desired outcome for the radio access network; retrieving, based on the desired outcome, an auxiliary information set pertaining to the radio access network; generating, by the natural language processing function, a custom contextual query based on the desired outcome defined by the natural language input and the auxiliary information set; providing the custom contextual query to a large language model of the natural language processing function, wherein the custom contextual query causes the large language model to generate an operation sequence containing a plurality of commands defining an automated computing resource management task; and executing the operation sequence generated by the large language model based on the desired outcome defined by the natural language input and the auxiliary information set, wherein execution of the operation sequence causes the radio access network to perform the automated computing resource management task.

Example Clause P, the computer readable storage medium of Example Clause O, wherein the desired outcome defined by the natural language input comprises an implementation of networking functionality within the radio access network.

Example Clause Q, the computer readable storage medium of Example Clause P, wherein the operation sequence causes the system to retrieve and install a component facilitating the network functionality.

Example Clause R, the computer readable storage medium of any one of Example Clause O through P, wherein the auxiliary information set comprises documentation that is specific to the radio access network.

Example Clause S, the computer readable storage medium of any one of Example Clause O through P, wherein the auxiliary information set comprises diagnostic information that is retrieved in response to an event within the radio access network.

Example Clause T, the computer readable storage medium of any one of Example Clause O through S, wherein the custom contextual query includes an intrinsic instruction for constraining a behavior of the large language model.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different workloads)

It is claimed:

1. A method for translating a natural language input into an automated computing resource management task for a radio access network providing a telecommunications service, the method performed by a computing environment associated with the radio access network, the method comprising:

receiving the natural language input defining a desired outcome for the computing environment associated with the radio access network;

analyzing the natural language input utilizing a natural language processing function to detect the desired outcome for the computing environment associated with the radio access network;

retrieving, based on the desired outcome, an auxiliary information set pertaining to the radio access network;

generating, by the natural language processing function, a custom contextual query based on the desired outcome defined by the natural language input and the auxiliary information set;

providing the custom contextual query to a large language model of the natural language processing function, wherein the custom contextual query causes the large language model to generate an operation sequence containing a plurality of commands defining the automated computing resource management task; and configuring the computing environment associated with the radio access network with the operation sequence generated by the large language model based on the desired outcome defined by the natural language input and the auxiliary information set, wherein the operation sequence causes the computing environment associated with the radio access network to perform the automated computing resource management task.

2. The method of claim 1, wherein the desired outcome defined by the natural language input comprises an implementation of networking functionality within the radio access network.

3. The method of claim 2, wherein the operation sequence causes the computing environment associated with the radio access network to retrieve and install a component facilitating the network functionality.

4. The method of claim 1, wherein the auxiliary information set comprises documentation that is specific to the computing environment associated with the radio access network.

5. The method of claim 1, wherein the auxiliary information set comprises diagnostic information that is retrieved in response to an event within the radio access network.

6. The method of claim 1, wherein the custom contextual query includes an intrinsic instruction for constraining a behavior of the large language model.

7. The method of claim 1, wherein the natural language input is a predetermined natural language input that is selected from a set of predetermined natural language inputs.

8. A system for translating a natural language input into an automated computing resource management task for a radio access network providing a telecommunications service, the system comprising:

a processing system; and a computer readable medium having encoded thereon computer readable instructions that when executed by the processing system cause the system to perform operations comprising:

receiving the natural language input defining a desired outcome for the radio access network;

analyzing the natural language input utilizing a natural language processing function;

detecting, based on the analyzing, the desired outcome for the radio access network;

retrieving, based on the desired outcome, an auxiliary information set pertaining to the radio access network;

generating, by the natural language processing function, a custom contextual query based on the desired outcome defined by the natural language input and the auxiliary information set;

providing the custom contextual query to a large language model of the natural language processing function, wherein the custom contextual query causes the large language model to generate an operation sequence containing a plurality of commands defining the automated computing resource management task; and executing the operation sequence generated by the large language model based on the desired outcome defined by the natural language input and the auxiliary information set, wherein execution of the operation sequence causes the radio access network to perform the automated computing resource management task.

9. The system of claim 8, wherein the desired outcome defined by the natural language input comprises an implementation of networking functionality within the radio access network.

10. The system of claim 9, wherein the operation sequence causes the system to retrieve and install a component facilitating the network functionality.

11. The system of claim 8, wherein the auxiliary information set comprises documentation that is specific to the radio access network.

12. The system of claim 8, wherein the auxiliary information set comprises diagnostic information that is retrieved in response to an event within the radio access network.

13. The system of claim 8, wherein the custom contextual query includes an intrinsic instruction for constraining a behavior of the large language model.

14. The system of claim 8, wherein the natural language input is a predetermined natural language input that is selected from a set of predetermined natural language inputs.

15. A computer readable storage medium having encoded thereon computer readable instructions that, when executed by a system, cause the system to perform operations comprising:

receiving a natural language input defining a desired outcome for a radio access network;

analyzing the natural language input utilizing a natural language processing function;

detecting, based on the analyzing, the desired outcome for the radio access network;

retrieving, based on the desired outcome, an auxiliary information set pertaining to the radio access network;

generating, by the natural language processing function, a custom contextual query based on the desired outcome defined by the natural language input and the auxiliary information set;

providing the custom contextual query to a large language model of the natural language processing function, wherein the custom contextual query causes the large language model to generate an operation sequence containing a plurality of commands defining an automated computing resource management task; and executing the operation sequence generated by the large language model based on the desired outcome defined by the natural language input and the auxiliary information set, wherein execution of the operation sequence causes the radio access network to perform the automated computing resource management task.

16. The computer readable storage medium of claim 15, wherein the desired outcome defined by the natural language input comprises an implementation of networking functionality within the radio access network.

17. The computer readable storage medium of claim 16, wherein the operation sequence causes the system to retrieve and install a component facilitating the network functionality.

18. The computer readable storage medium of claim 15, wherein the auxiliary information set comprises documentation that is specific to the radio access network.

19. The computer readable storage medium of claim 15, wherein the auxiliary information set comprises diagnostic information that is retrieved in response to an event within the radio access network.

20. The computer readable storage medium of claim 15, wherein the custom contextual query includes an intrinsic instruction for constraining a behavior of the large language model.

* * * * *